United States Patent
Taketomi et al.

(10) Patent No.: US 7,599,070 B2
(45) Date of Patent: Oct. 6, 2009

(54) OPTICAL AXIS POLARIZATION TYPE LASER INTERFEROMETER

(75) Inventors: Naoyuki Taketomi, Tsukuba (JP); Makoto Abbe, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 58 days.

(21) Appl. No.: 12/031,335

(22) Filed: Feb. 14, 2008

(65) Prior Publication Data
US 2008/0198387 A1 Aug. 21, 2008

(30) Foreign Application Priority Data
Feb. 19, 2007 (JP) .............................. 2007-037410

(51) Int. Cl.
G01B 9/02 (2006.01)
G01B 11/02 (2006.01)
(52) U.S. Cl. ........................................ 356/498; 356/493
(58) Field of Classification Search ................. 356/482, 356/486, 487, 493, 498
See application file for complete search history.

(56) References Cited

U.S. PATENT DOCUMENTS

| | | | | |
|---|---|---|---|---|
| 5,681,981 | A * | 10/1997 | McMurtry | 73/1.73 |
| 5,757,474 | A * | 5/1998 | Sopori et al. | 356/72 |
| 6,226,884 | B1 * | 5/2001 | McMurtry | 33/557 |
| 6,563,569 | B2 * | 5/2003 | Osawa et al. | 356/4.09 |
| 6,870,605 | B2 * | 3/2005 | Osawa et al. | 356/4.09 |
| 7,174,652 | B2 * | 2/2007 | McMurtry | 33/558.2 |
| 7,388,674 | B2 * | 6/2008 | Yanaka et al. | 356/498 |
| 7,408,650 | B2 * | 8/2008 | Ueshima et al. | 356/498 |
| 2002/0036764 | A1 * | 3/2002 | Osawa et al. | 356/4.09 |
| 2003/0179362 | A1 * | 9/2003 | Osawa et al. | 356/4.09 |
| 2007/0024861 | A1 * | 2/2007 | Yanaka et al. | 356/498 |
| 2008/0049211 | A1 * | 2/2008 | Ueshima et al. | 356/4.09 |
| 2008/0316497 | A1 * | 12/2008 | Taketomi et al. | 356/498 |

FOREIGN PATENT DOCUMENTS

| | | |
|---|---|---|
| DE | 20 2004 007 647 | 8/2004 |
| EP | 0 919 830 | 6/1999 |
| JP | 06-190225 | 7/1994 |

* cited by examiner

*Primary Examiner*—Patrick J Connolly
(74) *Attorney, Agent, or Firm*—Rankin, Hill & Clark LLP

(57) ABSTRACT

An optical axis polarization type laser interferometer including a reference sphere which forms a reference of measurement, a retro-reflecting means disposed at a measurement object, a laser interference measuring apparatus for outputting a measurement value corresponding to an increase or a decrease in the distance to and from the retro-reflecting means; and a two-axis turning mechanism for turning an emission beam of the corresponding laser interference measuring apparatus centering around the reference sphere, which measures, with the center coordinates of the reference sphere used as the reference, the distance to and from the retro-reflecting means where the optical axes of the emission beam from the laser interference measuring apparatus mounted on the two-axis turning mechanism and a return beam become parallel to each other, wherein the fixing portion of the first axis turning mechanism installed at the base part of the apparatus is disposed at the inner circumference thereof, the reference sphere is placed at the fixing portion thereof, and at the same time, the moving portion of the first axis turning mechanism is placed at the outer circumference of the fixing portion, and the second axis turning mechanism is mounted on the moving portion thereof. Therefore, complexities in mechanism design can be simplified to a large extent with respect to the first axis turning mechanism that composes the two-axis turning mechanism.

7 Claims, 6 Drawing Sheets

# US 7,599,070 B2

OPTICAL AXIS POLARIZATION TYPE LASER INTERFEROMETER

CROSS-REFERENCE TO RELATED APPLICATION

The disclosure of Japanese Patent Application No. 2007-37410 filed on Feb. 19, 2007 including specifications, drawings and claims is incorporated herein by reference in its entirety.

BACKGROUND OF THE INVENTION

1. Field of the Invention

The present invention relates to an optical axis polarization type laser interferometer including a reference sphere which forms a reference of measurement, a retro-reflecting means disposed at a measurement object, a laser interference measuring apparatus for outputting a measurement value corresponding to an increase or a decrease in the distance to and from the retro-reflecting means, and a two-axis turning mechanism for turning an emission beam of the corresponding laser interference measuring apparatus centering around the reference sphere, which measures, with the center coordinates of the reference sphere used as the reference, the distance to and from the retro-reflecting means where the optical axes of the emission beam from the laser interference measuring apparatus placed on the two-axis turning mechanism and a return beam become parallel to each other. In particular, the invention relates to an optical axis polarization type laser interferometer capable of remarkably simplifying complexities in mechanism design with respect to the first axis turning mechanism that composes the two-axis turning mechanism.

2. Description of the Related Art

As shown in FIG. 1, an optical axis polarization type laser interferometer (also called a tracking type laser interferometer) has been known, which irradiates a laser beam (called a measurement light beam) 22 from a laser interference measuring apparatus 20 toward a retro-reflecting means (also called a retro-reflector) 12 disposed at a measurement object 10, detects a displacement of the retro-reflecting means 12 by utilizing interference of the laser beam reflected in the return direction by the retro-reflecting means 12 and at the same time executes tracking by using a change in the position of the optical axis of the measurement light beam 22 by the two-axis turning mechanism 30. In the drawing, reference numeral 24 denotes a light source, and 26 denotes a laser beam emitted in the direction completely opposite to a target (12) in order to measure a relative displacement between the surface of the reference sphere 34 installed at the center of the two-axis turning mechanism 30 and the laser interference measuring apparatus 20. Reference numeral 34 denotes a reference sphere which forms a reference of measurement, 36 denotes a carriage for placing the laser interference measuring apparatus 20 on the two-axis turning mechanism 30, and 40 denotes a supporting portion for fixing the reference sphere 34.

Thus, in the optical polarization type laser interferometer accompanying the two-axis turning mechanism 30, it is necessary that a turning mechanism 30 having two axes orthogonal to each other is constructed around the reference sphere 34 that is installed at the center and becomes a measurement reference. However, it is not easy that a simple mechanism of high reliability is achieved with the turning center of the corresponding two-axis turning mechanism 30 aligned with the center of the reference sphere 34.

For example, Japanese Patent No. 2603429 (Patent Document 1) describes, as shown in FIG. 2, a mechanism which is based on a gimbal mechanism. In the drawing, reference numeral 31 denotes the first axis turning mechanism, 32 denotes the second axis turning mechanism, and 50 denotes the base portion of the apparatus.

Also, as shown in FIG. 3, European Patent No. EP0919830A2 (Patent Document 2) describes a two-axis turning mechanism that utilizes the profile of the reference sphere 34 and an optical fiber for guiding light. In the drawing, reference numeral 31R denotes a ring of the first axis turning mechanism 31 that composes the gimbal mechanism of the two-axis turning mechanism 30, 31M denotes a drive motor thereof, 32R denotes a ring of the second axis turning mechanism 32 that composes the gimbal mechanism of the two-axis turning mechanism 30 and 32M denotes a drive motor thereof.

In addition, German Patent Publication No. DE202004007647U1 (Patent Document 3) describes, as shown in FIG. 4, a two-axis turning mechanism 30 of a three-section structure having (1) a reference sphere supporting portion 40 for supporting the reference sphere, (2) a first axis turning mechanism moving portion 31A that composes the first axis turning mechanism 31, and (3) a first axis turning mechanism fixing portion 31B that composes the first axis turning mechanism 31 as well, and all of which being co-axially disposed from the center (1) a reference sphere supporting portion 40, (2) a first axis turning mechanism moving portion 31A, and (3) a first axis turning mechanism fixing portion 31B.

However, since the two-axis turning mechanism described in Patent Document 1 guides light by means of a beam bender as means for guiding light of the laser interference measuring apparatus 20 to the two-axis turning mechanism 30, it is necessary that a considerably complex mechanism design is carried out only for the sake of guiding light from the light source.

Also in Patent Document 2, the mechanism design adopts a configuration in which both two axes surround the reference sphere 34, wherein the design thereof still remains complex. In particular, it is necessary to control the laser interference measuring apparatus via two rings 31R, 32R, which compose the gimbal mechanism, and via a sliding mechanism corresponding thereto in order to change the emission direction of the laser interference measuring apparatus 20. Such a complex mechanism requires a high cost even for only to cause it to be driven as a designed mechanism. Further, in the case of an optical axis polarization type laser interferometer, there may be cases where it becomes necessary for the two-axis turning mechanism 30 to be feedback-controlled in line with movement of a target. In this case, it is necessary to minimize non-linear phenomena such as friction, backlash, etc., which pose a risk of adversely influencing the control, in the stage of mechanism design, wherein the cost is further increased. Therefore, as far as the art according to Patent Document 2 is concerned, this necessitates that a remarkably high cost design is executed in terms of industrial aspect.

On the other hand, the mechanism described in Patent Document 3 is further remarkably simplified in comparison with the mechanism designed in Patent Document 2, wherein the first axis and the second axis orthogonal thereto are made clearly separate from each other in the stage of mechanism design. However, since the reference sphere supporting portion 40 for supporting the reference sphere 34 is separated from each component of the first axis turning mechanism 31, it is necessary to prepare a long reference sphere supporting portion 40 that passes through the first axis turning mechanism 31 at its center. Since the center coordinate of the reference sphere 34 is an important factor that becomes the measurement reference of an optical axis polarization type laser interferometer, the mechanical stability of the reference sphere supporting portion 40 for supporting the center coordinate is an important specification item in terms of mechanism design. For example, it is necessary that unexpected displacement of the center coordinates of the reference sphere resulting from natural frequencies and thermal expansion is managed within an appropriate range. From this perspective, it cannot be necessarily said that the mechanism design described in Patent Document 3 is optimized.

That is, it is not realistic that the installation environment of the optical axis polarization type laser interferometer is remarkably strictly restricted. Therefore, if it temporarily attempts to reduce unexpected displacement resulting from thermal expansion of the reference sphere supporting portion 40, adoption of a material whose coefficient of thermal expansion is low is taken into consideration. Generally, the mechanical feature of a material having a low coefficient of thermal expansion, in particular, the specific rigidity influencing the resonance frequency is low in comparison with mechanical structure materials. It is required that the reference sphere supporting portion 40 according to Patent Document 3 is shaped to be slender, the length-to-width ratio of which is large, wherein it is difficult that the mechanism design is optimized from this perspective.

Further, since the weight of the second axis, an interferometer, and a displacement gauge, which are supported by the first axis turning mechanism 31, is increased, it is necessary to achieve an economical design while satisfying required functions such as turning accuracy, weight, etc.

SUMMARY OF THE INVENTION

The present invention was developed to solve the problems and shortcomings of the prior arts, and it is therefore an object of the present invention to remarkably simplify complexities in mechanism design in regard to the first axis turning mechanism that composes the two-axis turning mechanism.

The present invention solves the above-described problems and shortcomings by means of an optical axis polarization type laser interferometer including a reference sphere which forms a reference of measurement, a retro-reflecting means disposed at a measurement object, a laser interference measuring apparatus for outputting a measurement value corresponding to an increase or a decrease in the distance to and from the retro-reflecting means, and a two-axis turning mechanism for turning an emission beam of the corresponding laser interference measuring apparatus centering around the reference sphere, which measures, with the center coordinates of the reference sphere used as the reference, the distance to and from the retro-reflecting means where the optical axes of the emission beam from the laser interference measuring apparatus placed on the two-axis turning mechanism and a return beam become parallel to each other, wherein the fixing portion of the first axis turning mechanism installed at the base part of the apparatus is disposed at the inner circumference thereof, the reference sphere is placed at the fixing portion thereof, and at the same time, the moving portion of the first axis turning mechanism is placed at the outer circumference of the fixing portion, and the second axis turning mechanism is mounted on the moving portion thereof.

The second axis turning mechanism may have axes each disposed at both sides of the reference sphere with the reference sphere placed therebetween or an axis disposed at one side of the reference sphere.

The optical axis polarization type laser interferometer may have a displacement gauge for measuring changes in the distance between the laser interference measuring apparatus and the surface of the reference sphere at the opposite side of a measurement light beam thereof.

The displacement gauge may be an electrostatic capacitance type displacement gauge or an eddy current type displacement gauge.

A plurality of displacement gauges may be provided.

The reference sphere may be a metal-made sphere or a metal-coated sphere.

The present invention may employ a two-section structure including the moving portion of the first axis turning mechanism by rationalizing the three-section structure described in Patent Document 3, integrating the reference sphere supporting portion and the fixing portion of the first axis turning mechanism, and omitting the reference sphere supporting portion being slender and passing through the center portion of the first axis turning mechanism. As a result, with the present invention, mechanism design, parts machining, and assembling adjustment may be simply and easily carried out, wherein low-cost production may be achieved, and a further compact mechanism may be brought about.

In addition, in the prior art shown in, for example, FIG. 4, it was necessary to provide unnecessary spacing to drive the moving portion positioned relatively internally. However, according to the present invention, since the moving portion of the first axis turning mechanism is provided outside, the moving portion may be driven by, for example, a belt from the outside, wherein such unnecessary spacing is not required anymore.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Preferred exemplary embodiments of the present invention will now be described in detail, with respect to the drawings.

Best Mode for Carrying Out the Invention

Hereinafter, a detailed description is given of embodiments of the present invention with reference to the drawings.

Figure 1:
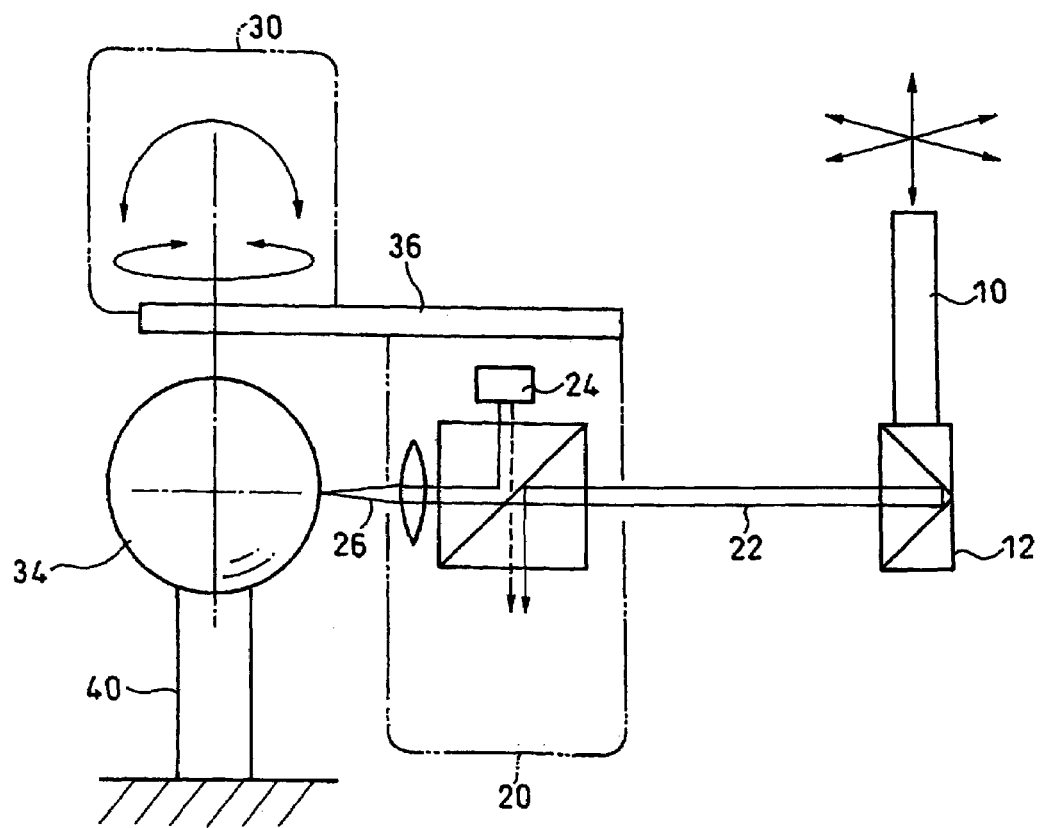
FIG. 1 is an optical path diagram showing one example of an optical system of a prior art optical axis polarization type laser interferometer.
Figure 2:
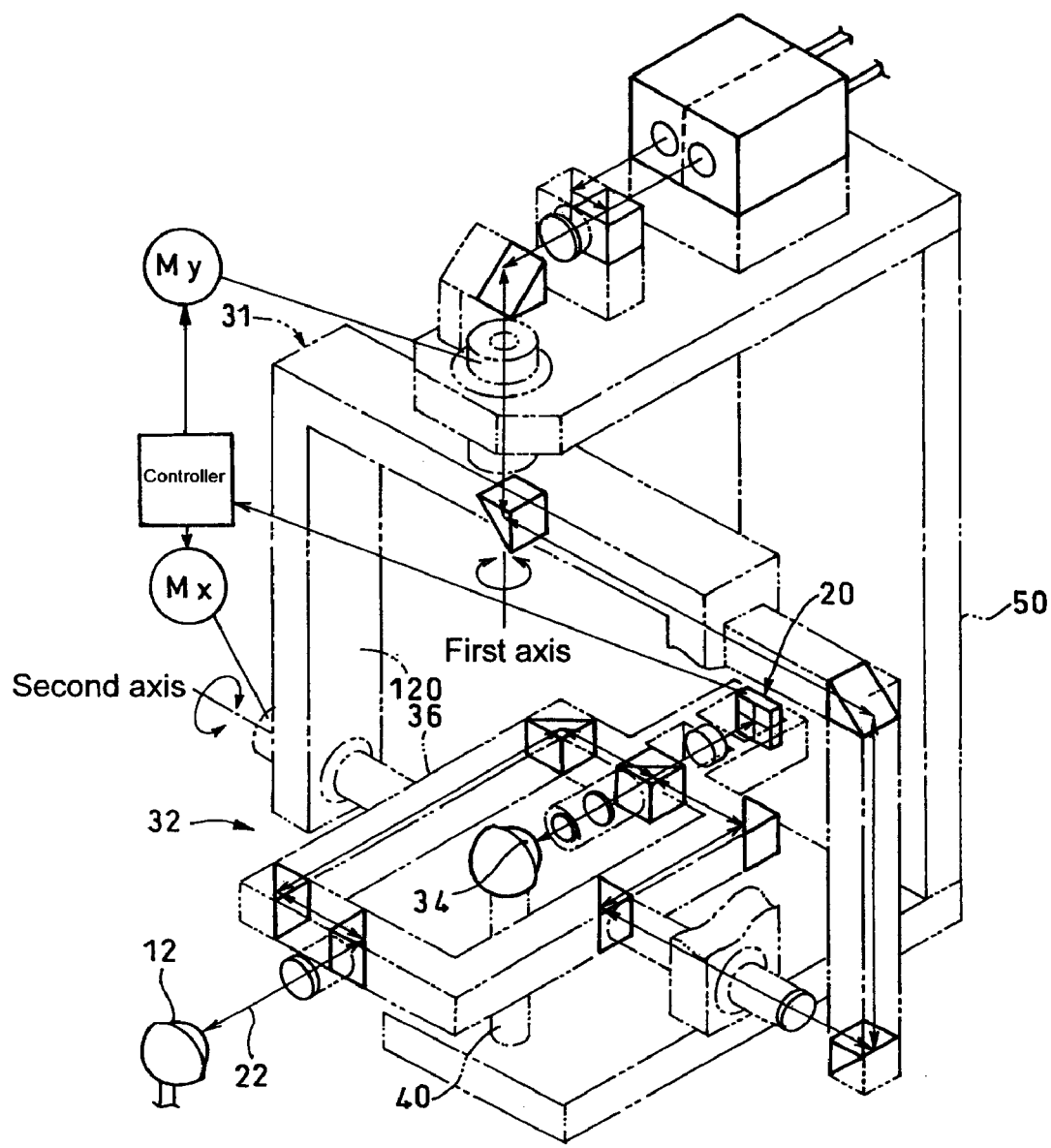
FIG. 2 is a perspective view showing a configuration of a two-axis turning mechanism of the optical axis polarization type laser interferometer described in Patent Document 1.
Figure 3:
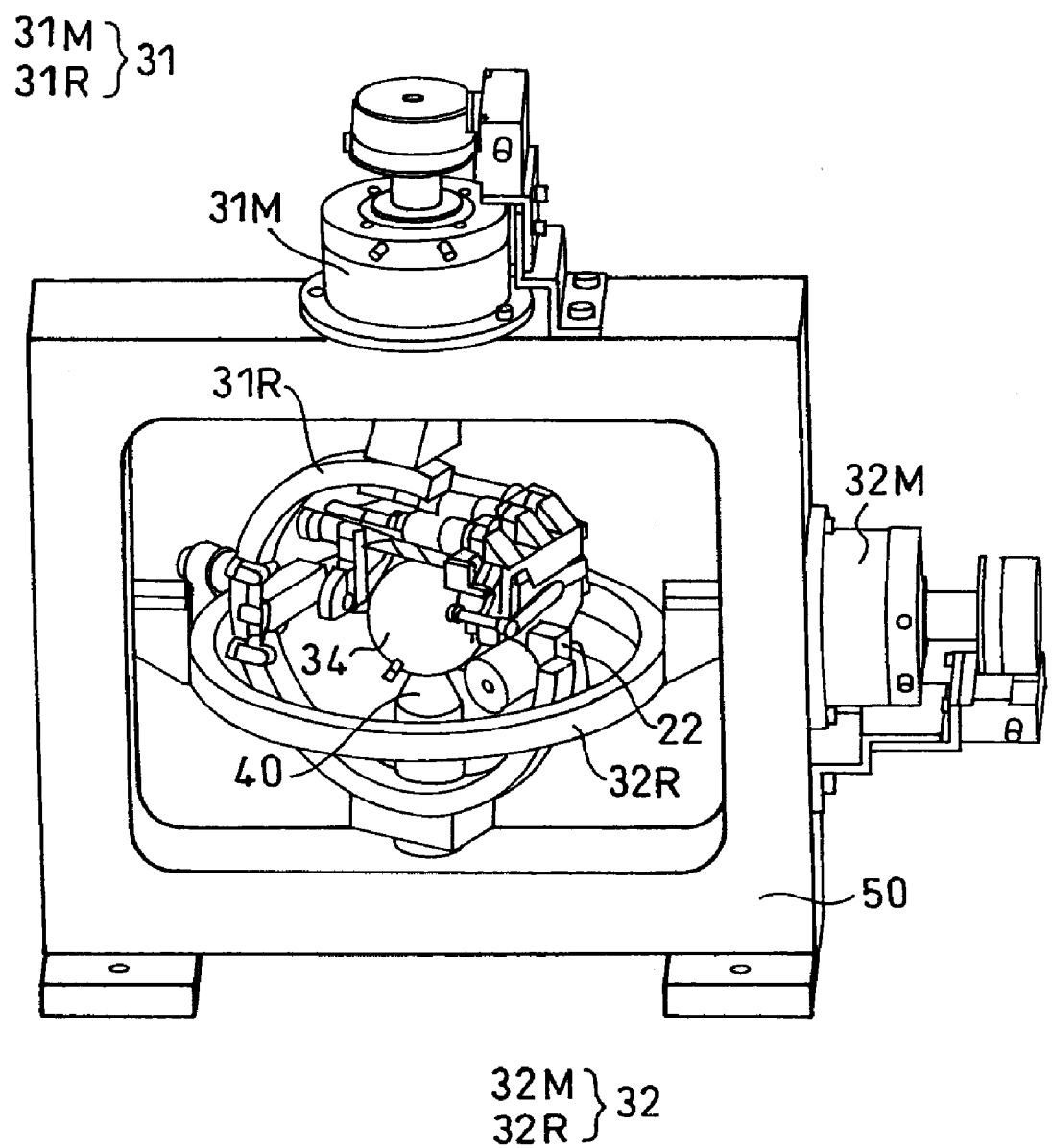
FIG. 3 is a perspective view showing a configuration of a two-axis turning mechanism of the optical axis polarization type laser interferometer described in Patent Document 2.
Figure 4:
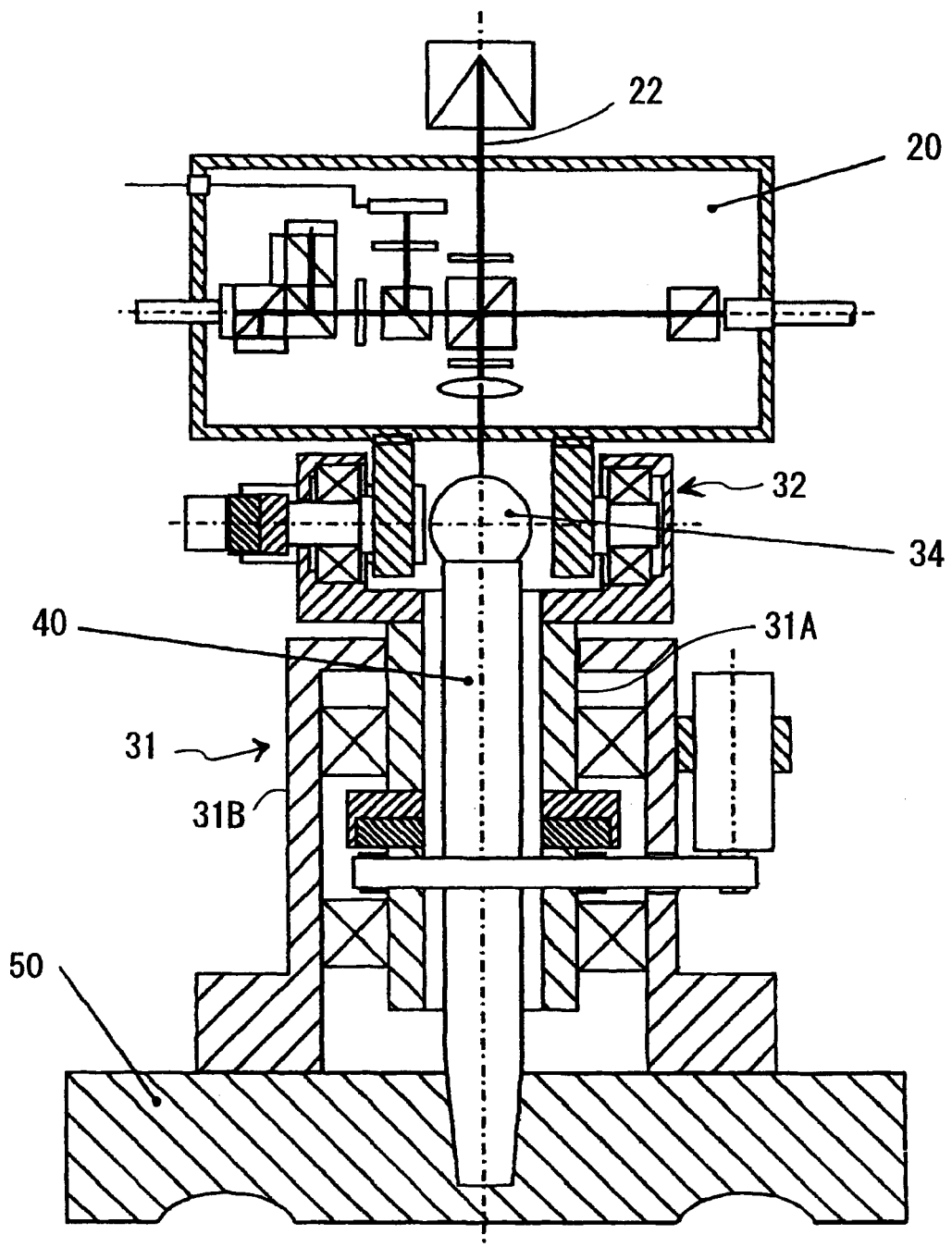
FIG. 4 is a sectional view showing a configuration of a two-axis turning mechanism of the optical axis polarization type laser interferometer described in Patent Document 3.
Figure 5:
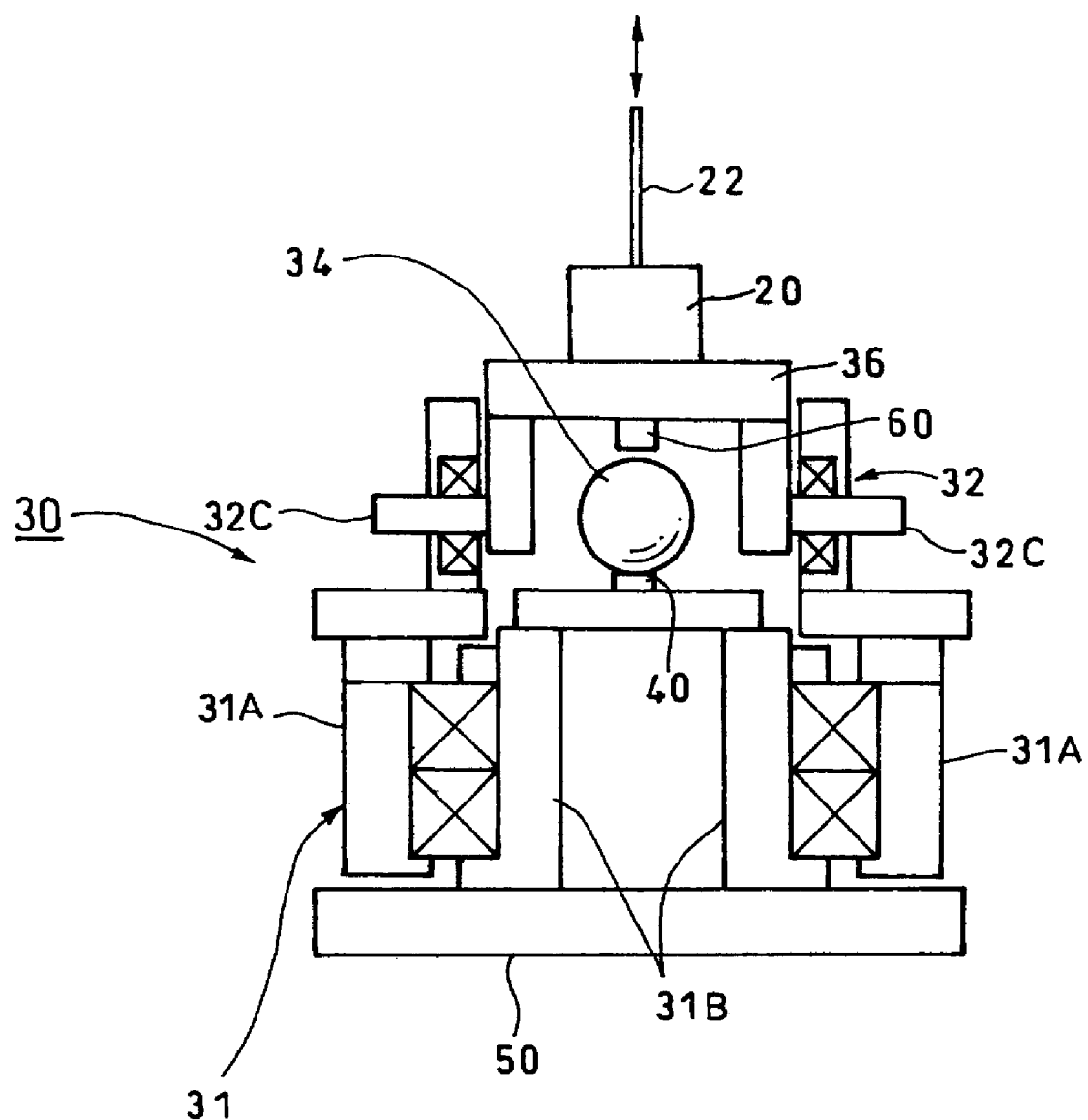
FIG. 5 is a sectional view showing a configuration of Embodiment 1 according to the present invention.

Embodiment 1 according to the present invention is, as shown in FIG. 5, such that a fixing portion 31B of the first axis turning mechanism 31 installed at the base portion 50 of an apparatus is disposed at the inner circumference, a reference sphere 34 is disposed thereat via a reference sphere supporting portion 40, and at the same time, a moving portion 31A of the first axis turning mechanism 31 is placed on the outer circumference of the fixing portion 31, and the second axis turning mechanism 32 is mounted thereon.

In the drawing, reference numeral 60 denotes a displacement gauge that measures changes in the distance between a laser interference measuring apparatus 20 mounted on a carriage 36 and the surface of the reference sphere 34 at the opposite side of the measurement light beam 22.

For example, a Michelson interferometer may be used as the laser interference measuring apparatus 20.

The axis 32C of the second axis turning mechanism 32 is divided into two sections with the reference sphere 34 placed therebetween and is located at both sides thereof.

For example, an electrostatic capacitance type displacement gauge or an eddy current type displacement gauge may be used as the displacement gauge 60. Since these displacement gauges have a large sensor effective area in comparison with the size of dirt and dust, and the horizontal resolution of the sensor is comparatively low, these displacement gauges are less influenced by dirt and dust on the surface of the reference sphere 34. In addition, a fiber sensor and various types of contact type displacement sensors may be used as the displacement gauge.

For example, a metal-made sphere that is available on the market may be used as the reference sphere 34. The sphere is industrially used and inexpensive. Also, the reference sphere 34 may be a ceramic-made, semiconductor-made, glass-made or metal-coated sphere other than the metal-made sphere. However, where an eddy-current sensor is used as the displacement gauge, it is necessary that a metal-made or metal-coated sphere is used.

In the embodiment, a change (displacement) $\Delta L$ in the length between a fixed reference sphere 34, the position of which is used as a reference point, and the retro-reflecting means 12 is calculated by the following expression.

$$\Delta L = \Delta L_2 + \Delta L_1 \quad (1)$$

Herein, $\Delta L_1$ is a relative displacement (the orientation of which is turned positive (plus) as the distance increases) with respect to the laser interference measuring apparatus 20 and the retro-reflecting means 12, which is measured by using the laser interference measuring apparatus 20, and $\Delta L_2$ is a relative displacement (the orientation of which is turned positive (plus) as the distance increases) with respect to the displacement gauge 60 and the surface of the reference sphere 34. The displacement gauge 60 is installed between the laser interference measuring apparatus 20 and the reference sphere 34.

Since the distance from the surface of a highly accurate reference sphere 34 to the center of the reference sphere 34 is fixed at high accuracy, it is possible to highly accurately measure the displacement of the retro-reflecting means 12 with the center of the reference sphere 34 used as reference even if the first axis turning mechanism 31 and the second axis turning mechanism 32 turn centering around the center of the reference sphere 34.

The $\Delta L_1$ may be measured by a measurement method based on a publicly known Michelson interferometer in which the retro-reflecting means 12 is made into a measurement object, and the measurement method is referred to in Patent Document 2 and so on. Herein, a detailed description thereof is omitted.

An automatic tracking method of the retro-reflecting means 12 is the same as that described in Patent Document 2 and so on. Therefore, a description thereof is omitted.

In the embodiment, the second axis turning mechanism 32 has axes 32c each disposed at both sides of the reference sphere 34 with the reference sphere 34 placed therebetween, wherein the stability is high.

Figure 6:
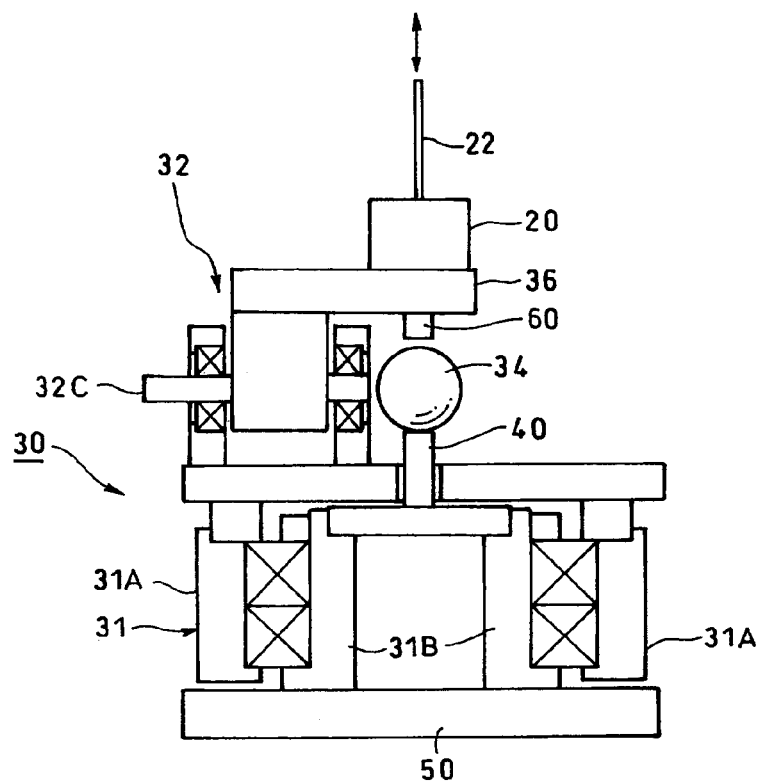
FIG. 6 is a sectional view showing a configuration of Embodiment 2 according to the present invention.

Next, referring to FIG. 6, a detailed description is given of Embodiment 2 of the present invention.

A point at which Embodiment 2 differs from Embodiment 1 resides in that the axis 32C of the second axis turning mechanism 32 is provided at one side (the left side in the drawing) of the reference sphere 34. All other points are similar to those of Embodiment 1, and description thereof is omitted.

Since, in the present embodiment, the second axis turning mechanism 32 has an axis disposed at one side of the reference sphere 34, another side (the right side in the drawing) of the reference sphere 34 is open, wherein the degree of freedom is high in terms of disposition.

Figure 7:
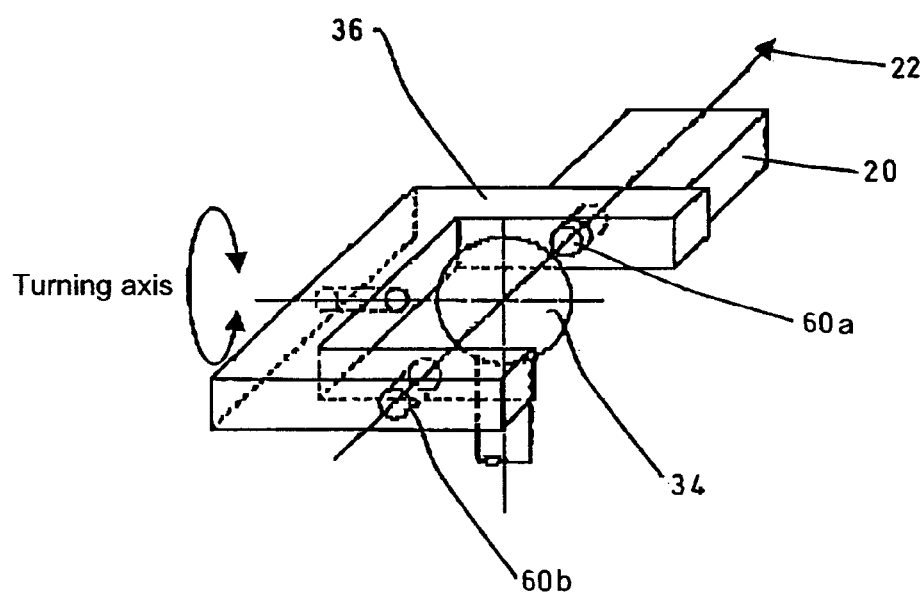
FIG. 7 is a perspective view showing major components of Embodiment 3 according to the present invention.

Since either one of the embodiments described above is provided with a single displacement gauge 60, the configuration is simple. Also, as in Embodiment 3 shown in FIG. 7 based on the case of FIG. 6, if a plurality of displacement gauges (in the drawings, two displacement gauges 60a and 60b) are provided, it is possible to compensate a temperature drift, etc., in the output of the displacement gauges. Herein, it is important that a plurality of displacement gauges 60a and 60b are disposed at both sides of the reference sphere 34, and the optical axis of the interferometer is aligned with the displacement gauges on the same line.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the present invention.

The invention claimed is:

1. An optical axis polarization type laser interferometer, comprising:
    a reference sphere which forms a reference of measurement;
    a retro-reflecting means disposed at a measurement object;
    a laser interference measuring apparatus for outputting a measurement value corresponding to an increase or a decrease in the distance to and from the retro-reflecting means; and
    a two-axis turning mechanism for turning an emission beam of the corresponding laser interference measuring apparatus centering around the reference sphere,
    which measures, with the center coordinates of the reference sphere used as the reference, the distance to and from the retro-reflecting means where the optical axes of the emission beam from the laser interference measuring apparatus placed on the two-axis turning mechanism and a return beam become parallel to each other, wherein the fixing portion of the first axis turning mechanism installed at the base part of the apparatus is disposed at the inner circumference thereof, the reference sphere is placed at the fixing portion thereof, and at the same time, the moving portion of the first axis turning mechanism is placed at the outer circumference of the fixing portion, and the second axis turning mechanism is mounted on the moving portion thereof.

2. The optical axis polarization type interferometer according to claim 1, wherein the second axis turning mechanism has axes each disposed at both sides of the reference sphere with the reference sphere placed therebetween.

3. The optical axis polarization type interferometer according to claim 1, wherein the second axis turning mechanism has an axis disposed at one side of the reference sphere.

4. The optical axis polarization type interferometer according to claim 1, further including a displacement gauge for measuring changes in the distance between the laser interference measuring apparatus and the surface of the reference sphere at the opposite side of the measurement light beam thereof.

5. The optical axis polarization type interferometer according to claim 4, wherein the displacement gauge is an electrostatic capacitance type displacement gauge or an eddy current type displacement gauge.

6. The optical axis polarization type interferometer according to claim 4, wherein a plurality of displacement gauges are provided.

7. The optical axis polarization type interferometer according to claim 1, wherein the reference sphere is a metal-made sphere or a metal-coated sphere.

* * * * *